United States Patent [19]

Romanelli

[11] 4,029,345
[45] June 14, 1977

[54] PIPE FITTINGS

[76] Inventor: Antonio Romanelli, Via A. Omodeo 120, Naples, Italy

[22] Filed: May 15, 1975

[21] Appl. No.: 577,927

[30] Foreign Application Priority Data

May 20, 1974 Italy .................................. 51117/74
Apr. 18, 1975 Italy .................................. 49191/75

[52] U.S. Cl. .......................... 285/334.2; 285/334.5
[51] Int. Cl.² ......................................... F16L 19/04
[58] Field of Search ......... 285/334.2, 334.1, 334.3, 285/334.5, 382.2, 382

[56] References Cited

UNITED STATES PATENTS

| | | | |
|---|---|---|---|
| 2,489,928 | 11/1949 | Phillips | 285/334.5 X |
| 3,269,756 | 8/1966 | Bloom | 285/334.5 X |
| 3,476,412 | 11/1969 | Demler | 285/382.2 X |
| 3,532,365 | 10/1970 | Kronschnabel | 285/334.5 X |
| 3,893,720 | 7/1975 | Moebius | 285/382.2 X |

FOREIGN PATENTS OR APPLICATIONS

| | | | |
|---|---|---|---|
| 1,142,066 | 3/1957 | France | 285/334.5 |
| 605,825 | 6/1960 | Italy | 285/334.1 |
| 836,901 | 6/1960 | United Kingdom | 285/334.2 |

Primary Examiner—Thomas F. Callaghan
Attorney, Agent, or Firm—Allen D. Brufsky

[57] ABSTRACT

The present invention relates to pipe fittings and more particularly to a pipe fitting wherein one or two seal rings of special configuration are used, so that a reliable fluid flow tightness between pipe sections being joined may be reached easier than by prior art.

6 Claims, 19 Drawing Figures

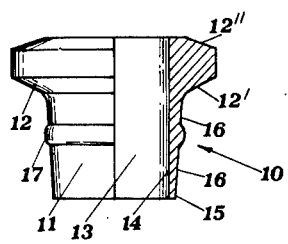
fig. 1
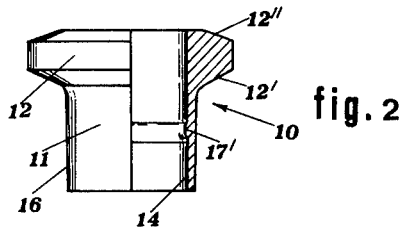
fig. 2
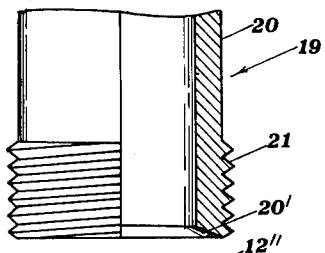
fig. 3
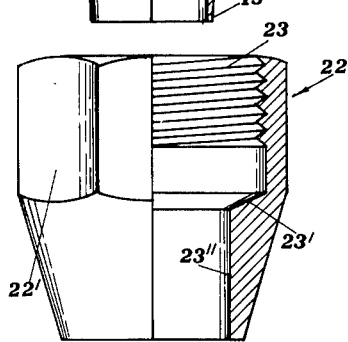
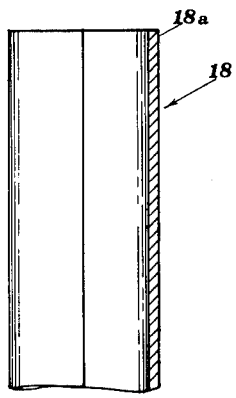
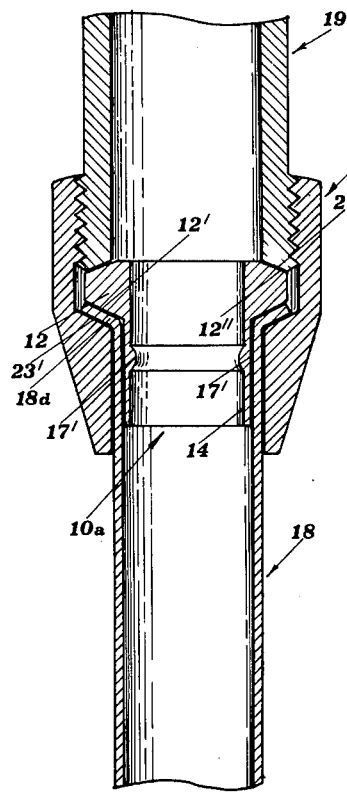
fig. 4
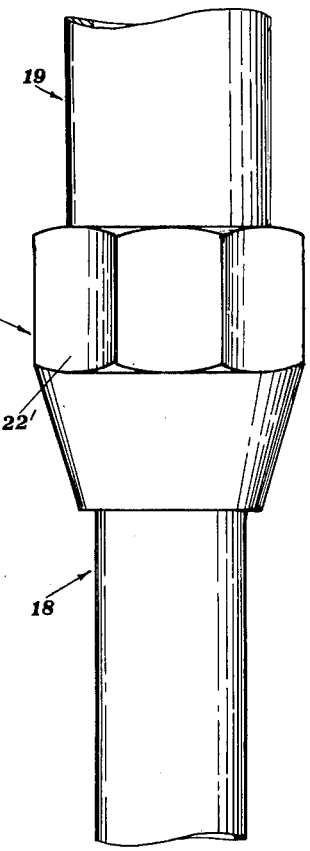
fig. 5

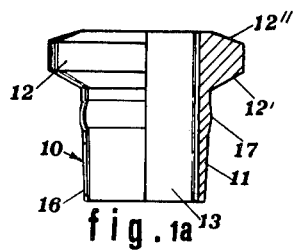
fig.1a
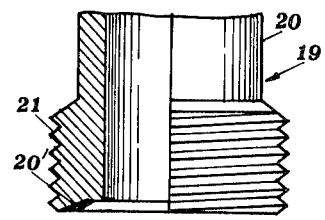
fig.3a
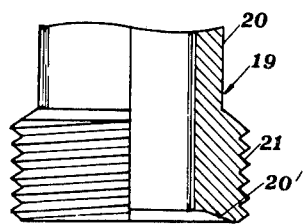
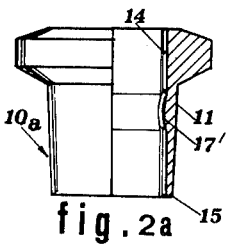
fig.2a
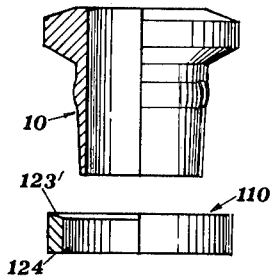
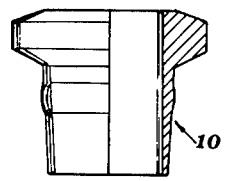
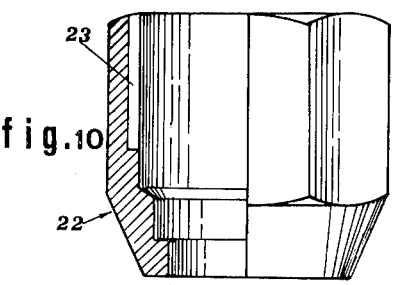
fig.10
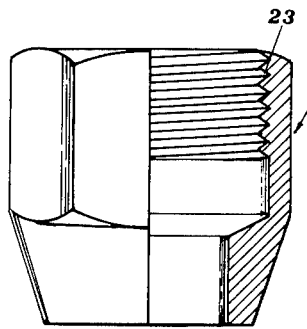
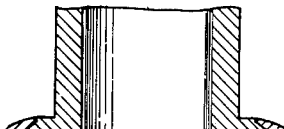
fig.4a
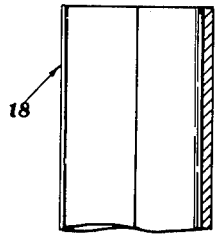
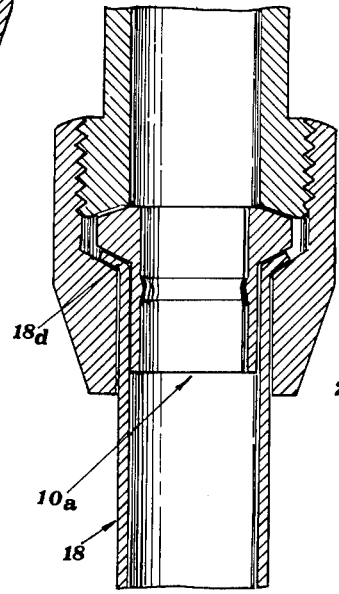
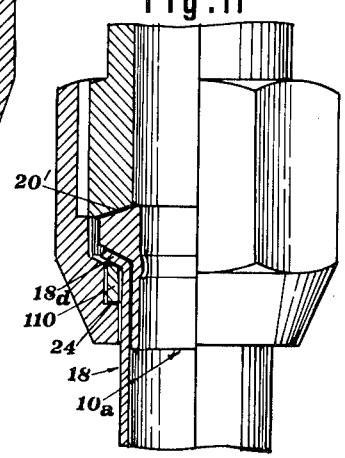
fig.11

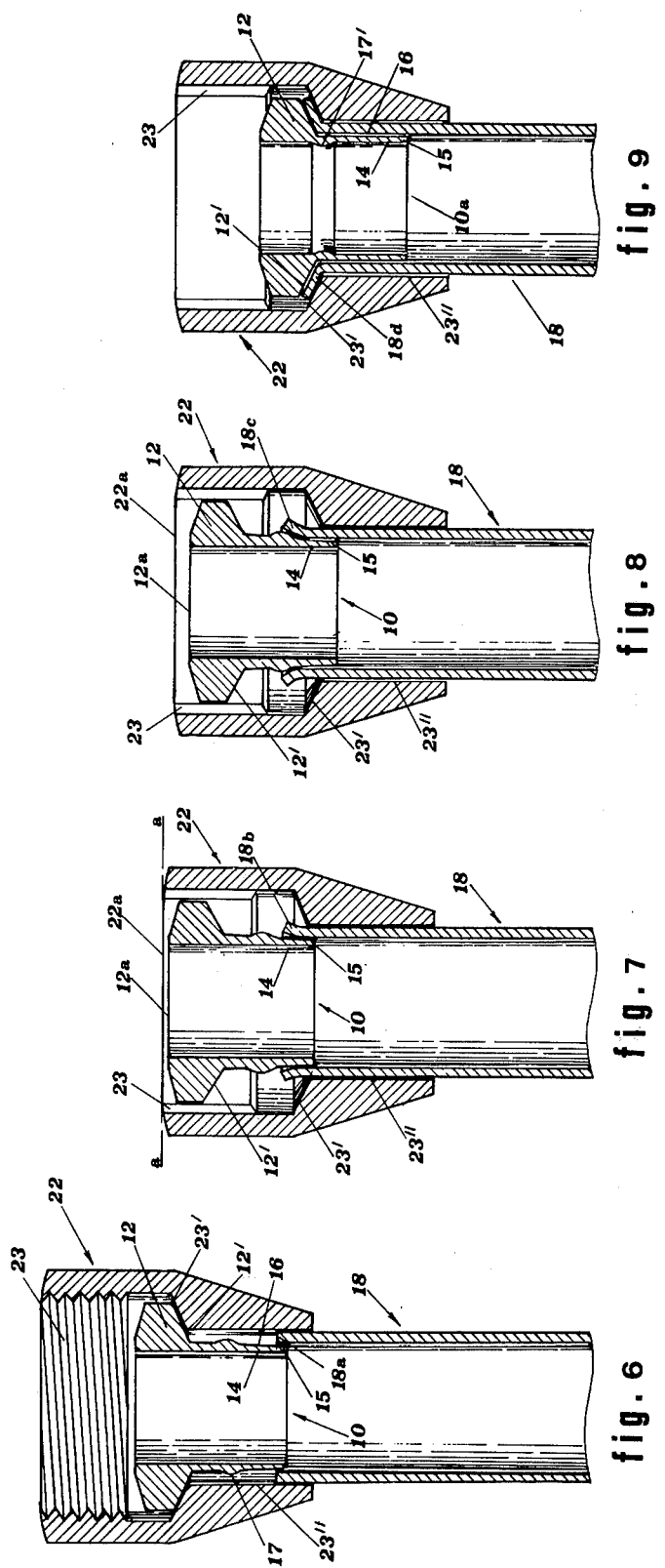

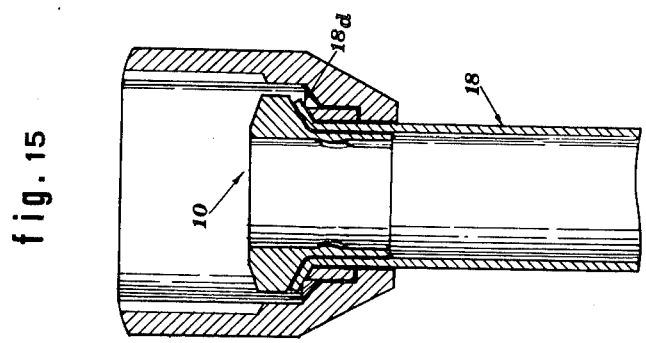
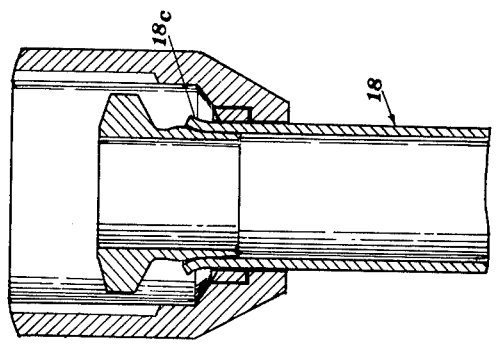
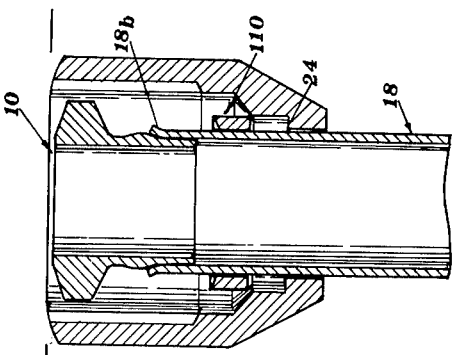
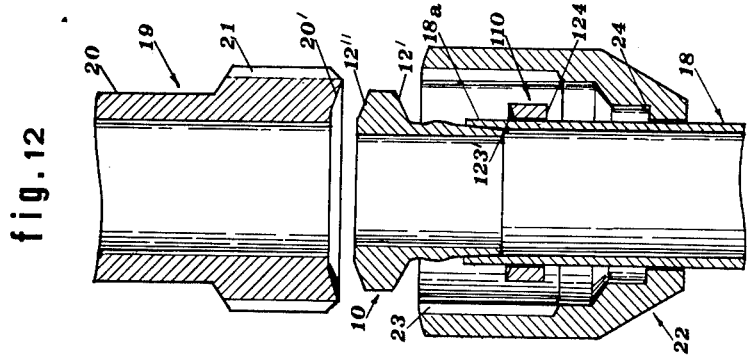

PIPE FITTINGS

BACKGROUND OF THE INVENTION

The use of a single flanged and shanked seal ring in a pipe fitting was already disclosed in the first patent application which had been filed by me on 20th May, 1974 and received the No. 51117 A/74. The use of a two seal ring unit for a pipe fitting relates to the application for patent of addition being also filed by me on 18th Apr. 1975, which received the No. 49191 A/75.

According to the first Italian patent application, the invention relates to a new flanged and shanked seal ring to be employed in a pipe fitting, the shank of which is slightly tapered in order to make easier its insertion into the pipe end of a pipe to be joined through said pipe fitting. Also because of its suitable small thickness, the shank outer shape is deformable, so that a perfect accommodation thereof will be obtained within that pipe end, while a contemporary flaring of the pipe end edge is due to the properly flanged head of this new seal ring which is acting thereon. A fluid flow tightness is thereby realized therebetween.

Employment of a pipe fitting is essential in many applications, e.g. for sanitary service installations or for pipes in pneumatic or hydraulic systems, etc., and the application may concern the joining of coaxial pipe sections, or tees, elbows, etc.

One of the more important problems relating to these pipe fittings concerns an easy and snug assembling of same between pipe sections to be joined and to reach a reliable tightness at the joining points, preferably without using any auxiliary gasket. The solution much more applied up to date concerned the employment of seal rings which are interposed between the pipe to be joined and the piece to which the joining is to be accomplished. According to the prior art, seal rings have been mounted on the outside of the pipe to be joined, the outer and inner shape of such seal ring been selected so that to form a tight joining of pipe sections as reliable as possible, also with deformation at the points where the pipe sections were joined, the tightness having evidently to be maintained when the fluid flow has the pressure in accordance with the scope of installation.

While by using such a seal ring on the outside of the pipe to be joined a sufficient tightness for fluid flow could by itself be obtained, in the practice some drawbacks have been pointed out, and a particular care was deemed as necessary by assembling the pipe fitting in order do not provide any stress or strain, even if an occasional type, at the joining points. As a consequence of these stresses or strains the pipe fitting assembly could result mechanically no good and also defective for its operative purpose. The edge of the pipe to be joined may, for example, undergo some bending stress by mounting such seal ring, and the drawback is not always evidenced by the operator during the assembling work. An undesirable deformation may only thereafter be noted and in consequence of same the pipe fitting operation will be negatively affected.

The use of a stiffening ring has further been suggested, and the application of same into the end portion of the pipe to be joined is oft performed. This solution of the problem has not yet been found, however, as a practical manner for avoiding such drawback. In any case the operator must show its best care in assembling pipe fittings of this type.

The main object of the present invention is to provide at least one flanged and shanked seal ring as integral body, which, because of the particular configuration of its flanged head and shank fulfils at the same time the function of seal ring and stiffening sleeve, because the shank of this seal ring will be inserted into the pipe end of the pipe to be joined, in order to avoid the drawback of prior art pipe fitting.

Another object of the present invention is to provide an integral flanged and shanked seal ring the shank of which is slightly tapered in order to be easily inserted into said pipe end by lightly forcing same by hand, the flanged head of said ring bein so shaped that a further light force will be necessary to further ensure the shank within said pipe end in a position which does not provide any undesirable stress or strain therein. When the assembling of such flanged and shanked seal ring is carried out, the flanged head causes the flaring of the pipe edge of the pipe to be joined, the inner surface of which will then tightly contact the corresponding lower outer surface of the flanged head.

A further object of the present invention is to provide the intermediate portion of the ring shank with an annular protuberance which is protruding from the outer surface thereof, the function of which is to make easier the flaring of the pipe edge for said tight contact with the facing lower outer surface of the flanged head, as well as a perfect accomodation of the peripheral surface of the shank within the end portion of the pipe being joined, because the suitable thin thickness of the ring tubular shank allows the necessary deformation thereof for said accomodation. As the thickness of the ring shank is suitably small, when its insertion into the end portion of the joined pipe is accomplished the outer protuberance results little by little transferred to the inner passage of the ring shank up to its complete protruding from the inner surface thereof, as an annular rib about the ring axis. The function of same will then be that of stiffening sleeve integral with the flanged head of this seal ring.

Another object of the present invention is to provide also a second, auxiliary annular ring to be mounted on the outside of the end portion of the pipe to be joined, in order to cooperate with the first flanged and shanked seal ring as above and make easier the assembling of a pipe fitting of this type, in order to avoid any possibility of eventual seizing of same when the assembling is to perform, the seizing being for example due to a not very good finish of the component members of the pipe fitting.

In order that the skilled in the art may understand better the scope of the present invention and the operation of the disclosed pipe fitting in its embodiments comprising a single flanged and shanked seal ring only or also a second, auxiliary annular ring, a description will follow, which is related to some embodiment examples as schematically shown in the accompanying drawings, wherein:

FIGS. 1-1a is diagrammatic elevation view of a flanged and shanked seal ring for pipe fitting according to the present invention with a partial section along the axis thereof, said view being related to said seal ring before being applied into the end portion of a pipe to be joined by means of said pipe fitting;

FIGS. 2-2a is a diagrammatic elevation view of a flanged and shanked seal ring as in FIGS. 1-1a, however after being inserted into said end portion of the pipe to be joined;

FIGS. 3–3a is an exploded elevation view of the several component members when pipe sections are to be joined to each other by means of a pipe fitting according to the present invention, wherein a single flanged and shanked seal ring is employed; said component members being shown in a partial section along its axes;

FIGS. 4–4a is a sectional view of coaxial pipe sections and related pipe fitting according to the present invention, when the component members as in FIGS. 3–3a have already been assembled;

FIG. 5 is an elevation view of the pipe assembly as in FIGS. 4–4a;

FIGS. 6 to 9 are the axial-section views of a pipe assembly in its consecutive assembling stages, which are relating to the use of a pipe fitting wherein a single flanged and shanked seal ring is used;

FIG. 10 is an exploded elevation view of the several component members when pipe section are to be joined to each other by means of a pipe fitting according to the present invention, similar to FIGS. 3–3a, wherein however a two seal ring unit is employed, said component members being shown in a partial section along its axes;

FIG. 11 is a partial sectional view of pipe sections being joined by means of a pipe fitting wherein a two seal ring unit as in FIG. 10 is used;

FIGS. 12 to 15 are the axial-section views similar to FIGS. 6 to 9 for showing the consecutive stages of assembling the component members, these figures being related to the use of a pipe fitting according to the present invention wherein a two seal ring unit is employed.

Referring now to the drawings in greater detail, the similar FIGS. 1 and 1a show the flanged and shanked seal ring according to the present invention in its condition before the insertion thereof into the end portion of the pipe to be joined is accomplished, while FIGS. 2 and 2a show said seal ring after the insertion. Seal ring 10 comprises as an integral body a stem 11 and a flanged head 12. Stem 11 is substantially slightly tapered, with an intermediate arcuate protuberance 17 protruding from the outer surface of shank 11. On the other hand, flanged head 12 is in this embodiment formed with a central cylindrical outer surface between a lower and upper conical surfaces 12' and 12", respectively, the scope of which will be explained hereafter.

In FIGS. 3–3a relating to this first embodiment example, wherein a single flanged and shanked seal ring 10 for pipe fitting is used, it was assumed that four component members will be assembled together. A pipe section 18 is to be joined to a main tubular piece 19, and a nut 22 is provided which is screwed onto the outer threaded end of pipe section 19. At first sight, the outer threaded end 21 of pipe section 19 and nut 22 could be considered as formed and operating in a conventional manner for pipe fitting. According to the present invention, however members 19 and 22 are actually provided with particular configurations, in order to facilitate a proper deformation of pipe edge 18a of pipe 18 through said flanged and shanked seal ring 10 for realizing the desired tightness of the pipe fitting in easier and more reliable manner than in the prior art.

In FIGS. 3–3a it may be seen that at the lower edge of threaded member 19 an annular conical surface 20' is provided, the taper of which is like to upper conical surface 12" of seal ring 10. Similarly, an annular inner conical surface 23' is provided at the bottom shoulder of nut 22, which is like to lower conical surface 12' of seal ring 10. That is, the tapers of annular surfaces 20' and 23' are opposed to each other similarly to the tapers of annular surfaces 12" and 12', respectively, for the purpose being explained hereafter.

End portion of seal ring 10 is cylindrical at its edge 15 (FIG. 1) and may be easily inserted into the pipe end 18a of pipe 18 to be joined. Because of the tapered shape 16 of shank 11, a short length only of shank 11 may be freely inserted, while for prosecuting the insertion of shank 11 into pipe 18 at 18a as desired, the flanged and shanked seal ring 10 must actually be forced into pipe 18, beginning by a manual action onto its head 12 and then eventually by using a wood hammer.

Pipe 18 may be of soft copper, aluminum and the like, as well as plastic material, so that it is deformable, with a progressive flaring of its edge 18a when shank 11 of seal ring 10 is inserted in subsequent stages up to the final flaring as at 18d (FIGS. 4–4a), as it will be explained hereinafter. In this final condition, the under surface of flared edge 18d will abut on the annular flared shoulder 23' of nut 22 having a like taper which, in turn, is like to the lower tapered surface 12' of flanged head 12, as said above. Such a condition, which will be obtained when nut 22 is tightened on to the threaded end portion of pipe section 19, will further contact the under annular surface 20' of said pipe section 19 and upper tapered surface 12" of flanged head 12, so that the desired tightness for fluid flow along pipes 19 and 18 through such a pipe fitting may be realized in a satisfying manner, as at the same time the particularly shaped shank 11 will find its best accomodation within the end portion of pipe section 18 to be joined.

As it was said above and shown in FIGS. 1–1a, shank 11 is actually designed with a conical shape 16 which is however provided with a cylindrical edge 15 and an annular intermediate, arcuate protuberance 17 protruding from the outer surface thereof.

In effect, dimensional characteristics of shank 11, namely the actual thickness of tapered portion 16 and protuberance 17, are selected so that protuberance 17 makes easier the flaring of pipe edge 18a when shank 11 is inserted therein, and will diminish its outwards protrusion as this latter is little by little transferred to the inner passageway of seal ring 10 up to a final shape as in FIGS. 2–2a, wherein the flanged and shanked seal ring has the reference numeral 10a. The outer surface of shank 11 will now be only slightly tapered and quite fitting together the inner surface of pipe section 18. For this reason shank 11 in its new shape has the contemporary function of a reinforcing sleeve as oft suggested and applied by a separate member, and annular rib of shank 11 by itself, when the insertion into pipe section 18 is completed. Fluid flow tightness throughout passageways of pipe sections 18 and 19 will then further ensured.

It was said above that in the joining area a stress or strain may also involuntary be provided by the operator by assembling a pipe fitting of the prior art, and this drawback is absolutely to avoid as suggested also by the manufacturers, when the seal ring is provided on the outside of the pipe to be joined. Also when a further, distinct stiffening ring is inserted into said pipe section, which is considered as desirable, in effect the possility of breakage or not suitable deformation at the area of the pipe fitting will remain, as a consequence of any stress or strain which may still occur in that area.

It should be understood by the skilled in the art that the new pipe fitting in accordance with the present invention, also when provided with a single flanged and shanked seal ring as in the described and illustrated embodiment, is a real and reliable improvement, not only for the tightness by itself, but also for its resistance to stress or strain being possible during the assembling stages.

Referring to this embodiment example, these particularities may easily be deduced by the skilled in the art through FIGS. 4–4a, where the entirely flared pipe edge 18d of pipe section 18 to be joined is firmly enclosed between conical lower surface 12' of flanged head 12 and like conical inner shoulder 23' of nut 22, when this latter is tight screwed on the threaded end portion of member 19. As a consequence of the fastening operation, shank 11 results as completely inserted within the end portion of pipe section 18, protuberance 17' being now protruding inwards from the inner surface of seal ring 10a, because the lower conical annular surface 20' of member 19 has forced it by acting on the facing upper conical surface 12'' of flanged head 12.

The consecutive stages for inserting shank 11 into the end portion of pipe section 18 to be joined and related gradual flaring of the pipe edge thereof are shown in FIGS. 6 to 9, from the initial position 18a to the final position 18d, respectively. In FIG. 6, the cylindrical end portion 15 of shank 11 only is inserted into the facing end of pipe section 18, the insertion being then progressively increased up to the position in FIG. 9, when locking nut 22 is screwed and tightened onto the threaded end portion of member 19 (see FIG. 4), to realize the final joining as above, by means of the pipe fitting according to the present invention.

When only the flanged and shanked seal ring 10 is used to accomplish the desired pipe joining, a seizure has however been noted sometime, particularly because of a not very good finished component member being employed at the joining area.

To avoid such eventual and unusual drawback, the initial pipe fitting as disclosed in the Italian patent application No. 51117A/74 was improved by adding an auxiliary ring for cooperating with said flanged and shanked seal ring 10. In the Italian application for patent of addition No. 49191A/75, the constructive and operative characteristics of this new two seal ring unit for pipe fitting have been described as recalled hereafter and illustrated particularly in FIGS. 10 to 15 of the accompanying drawings, wherein the new ring member and modifications in locking nut 22 of the pipe fitting are indicated by someother reference numerals.

Referring now to FIG. 10, five component members may be seen in the exploded view thereof, instead of the four component members being similarly shown in FIGS. 3–3a. FIGS. 11 and 12 to 15 are then related to the assembling of pipe sections 19 and 18 by means of a pipe fitting having this two seal ring unit, as well as the consecutive stages for such assembling, like to FIGS. 4–4a and 6 to 9, respectively.

Particularly when FIG. 3–3a and FIG. 10 are compared therebetween as showing the exploded views of a pipe section joining by using a pipe fitting having a single or two seal ring unit, respectively, i.e. with the flanged and shanked seal ring only, or with addition of an auxiliary seal ring 110, it may be seen that in this latter embodiment, a little modification inside the locking nut 22 is provided. Auxiliary seal ring 110 is an annular ring having a cylindrical outer surface, with a flat radial, annular undersurface 124 and a flared uppersurface 123', the inclination of which is like to undersurface 12' of flanged head 12 of flanged and shanked seal ring 10. The inner through hole diameter of such auxiliary seal ring 110 corresponds to the outer diameter of pipe section 18 to be joined, so that ring 110 may close slide along the outer surface of pipe section 18, when it is light forced for that purpose, as it occurs when locking nut 22 is screwed onto the threaded end portion 21 of main pipe section 19.

Locking nuts in FIGS. 3–3a and 10 differ therebetween because of the different inner bottom shape thereof. In FIG. 3–3a the actually useful inner bottom of locking nut 22 comprises a flared surface 23' only, which directly contact the little by little flared pipe edge of pipe section 18, from the initial condition 18a to the final condition 18d, as said above and shown in FIGS. 6 to 9. In the modified embodiment as shown, for example, in FIG. 12, an annular inner, flat shoulder 24 is, on the contrary, provided, which lies in a plane being perpendicular to the nut axis and is directly acting onto the corresponding flat undersurface 124 of auxiliary seal ring 110. In this manner the flaring of pipe section edge from the initial position 18a up to the final position 18d will be accomplished through said auxiliary seal ring 110, namely through its flared uppersurface 123'. As better shown in FIGS. 11 and 12, facing surfaces 24–124; 123-undersurface of flared edge 18d; uppersurface of flared edge 18d–12' will finally contact to each other in this new embodiment wherein also said cylindrical seal ring 110 is employed, while conical annular undersurface 20' of pipe section 19 will always contact the like tapered uppersurface 12'' of flanged head 12.

The fluid flow tightness throughout the pipe fitting is then effectively ensured also when it is employed in that modified embodiment, wherein a two seal ring unit is provided. At the same time, however, it is further deemed as substantially avoided any possibility of seizure by tightening locking nut 22 onto the threaded end 21 of member 19, as a very small annular area is actually involved in the relative rotary motion between facing flat surfaces 24 and 124, the latter of which is substantially subjected to a sliding motion along the outer surface of pipe section 18 when locking nut 22 pushes on auxiliary seal ring 110 for flaring the pipe edge of pipe section 18.

It is understood that certain other modifications and changes in the construction of a pipe fitting, utilizing the features described and illustrated in above embodiment examples, are intended to come within the scope of the present invention, as in the appended claims.

What I claim is:

1. For use in establishing a fluid tight connection, a sealing assembly comprising:
   a cylindrical pipe;
   a tube having an inwardly-beveled end, said tube being in axial alignment with said pipe;
   a first sealing ring having a flanged head including a beveled upper surface, the bevel of which substantially matches the bevel at the end of said tube, a beveled undersurface and a shank tapering inwardly from the beveled undersurface to a short cylindrical portion adjacent the free end of the shank, the surface of said shank diverging slightly from the common axis of said pipe and said tube and the surface of said beveled undersurface diverging sharply from the common axis, the short cylindrical portion of said shank having a lesser outside diameter than the inside diameter of said pipe to facilitate initial, partial entry of the shank into said pipe, said shank including a pipe-flaring annular protruberance which extends outwardly from the shank surface prior to assembly but is deformed inwardly by said cylindrical pipe in the completed assembly, said flanged head and said shank having a hole therethrough; and a locking nut comprising an annular body having a first hole extending inwardly from one end and a second smaller, axially aligned hole extending inwardly from the other end, the body of said nut having a beveled shoulder at the juncture of the first and second holes, the bevel of the shoulder substantially matching the bevel of the undersurface of the flanged head, said first hole being larger in diameter than the diameter of the flanged head and said second hole being smaller in diameter than the diameter of the flanged head, said nut including means for drawing the nut onto the tube to draw the beveled end of the tube into contact with the beveled upper surface of the flanged head and the end of the pipe initially into contact with the tapered shank and the pipe flaring protruberance, both of which act to flare the end of the pipe to produce a flared pipe surface for mating contact with the beveled undersurface of the flanged head.

2. A sealing assembly as recited in claim 1 wherein said tube has external threads adjacent its beveled end and said locking nut includes complementary internal threads over at least part of the strength of the first hole.

3. A sealing assembly as recited in claim 1 further including an auxiliary cylindrical sealing ring having an upper surface with a bevel which matches the bevel on the under surface of the flanged head of the first sealing ring, the inner diameter of said auxiliary cylindrical sealing ring being slightly larger than the outer diameter of the cylindrical pipe to establish a sliding fit between the sealing ring and the pipe.

4. A sealing assembly as recited in claim 2 further including an auxiliary cylindrical sealing ring having an upper surface having a bevel which matches the bevel on the undersurface of the flanged head of the first sealing ring, the inner diameter of said auxiliary cylindrical sealing ring being slightly larger than the outer diameter of the cylindrical pipe to establish a sliding fit between said auxiliary ring and the pipe.

5. A sealing assembly as recited in claim 3 wherein said locking nut further includes an inwardly protruding shoulder near the external end of the second hole for forcing said auxiliary cylindrical sealing ring toward the undersurface of the flanged head as said locking nut is drawn onto the tube.

6. A sealing assembly as recited in claim 4 wherein said locking nut further includes an inwardly protruding shoulder near the external end of the second hole for forcing said auxiliary cylindrical sealing ring toward the undersurface of the flanged head as said locking nut is threaded onto the tube.

* * * * *